US011945754B2

United States Patent
Lu et al.

(10) Patent No.: US 11,945,754 B2
(45) Date of Patent: Apr. 2, 2024

(54) DIRECT 4D PRINTING GRADIENT STRUCTURE CERAMICS

(71) Applicant: City University of Hong Kong, Hong Kong (HK)

(72) Inventors: Jian Lu, Hong Kong (HK); Lei Wan, Hong Kong (HK); Zhou Chen, Hong Kong (HK); Zhengyi Mao, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 294 days.

(21) Appl. No.: 17/512,664

(22) Filed: Oct. 27, 2021

(65) Prior Publication Data
US 2023/0128778 A1 Apr. 27, 2023

(51) Int. Cl.
| | | |
|---|---|---|
| *B33Y 10/00* | (2015.01) | |
| *B28B 1/00* | (2006.01) | |
| *B33Y 70/00* | (2020.01) | |
| *C04B 35/571* | (2006.01) | |

(Continued)

(52) U.S. Cl.
CPC ............ *C04B 35/571* (2013.01); *B28B 1/001* (2013.01); *B33Y 10/00* (2014.12); *B33Y 70/00* (2014.12); *C04B 35/6269* (2013.01); *C04B 35/64* (2013.01); *C04B 2235/3217* (2013.01); *C04B 2235/3225* (2013.01); *C04B 2235/3232* (2013.01); *C04B 2235/3244* (2013.01); *C04B 2235/3826* (2013.01); *C04B 2235/3865* (2013.01); *C04B 2235/3873* (2013.01); *C04B 2235/447* (2013.01); *C04B 2235/483* (2013.01); *C04B 2235/6026* (2013.01); *C04B 2235/656* (2013.01)

(58) Field of Classification Search
None
See application file for complete search history.

(56) References Cited

U.S. PATENT DOCUMENTS

| | | | | |
|---|---|---|---|---|
| 2019/0030783 A1* | 1/2019 | Lu | ...................... | C04B 35/488 |
| 2019/0381691 A1* | 12/2019 | Lu | ...................... | C04B 35/528 |
| 2019/0381725 A1* | 12/2019 | Lu | ...................... | C04B 35/5603 |

OTHER PUBLICATIONS

Fabio L. Bargardi, Hortense Le Ferrand, Rafael Libanori & Andre R. Studart; "Bio-inspired self-shaping ceramics", Nature communications, 7 (1) (2016) 1 (Year: 2016).*

* cited by examiner

*Primary Examiner* — Mohammad M Ameen
(74) *Attorney, Agent, or Firm* — Idea Intellectual Limited; Margaret A. Burke; Sam T. Yip

(57) ABSTRACT

A method for forming a complex shape three-dimensional ceramic article by printing a first layer of a first material having a first fraction of first ceramic particles and a first fraction of a first polymeric ceramic precursor. A second layer is printed such that it is at least partially disposed on the first layer of a second material having a second fraction of second ceramic particles and a second fraction of a second polymeric ceramic precursor. A composite of the first layer and the second layer is heated at a temperature sufficient to decompose the first and second polymeric ceramic precursors and sinter the article. During the sintering process, the first and second layers with different fractions of ceramic particles undergo different degrees of shrinkage, resulting in a tuneable mismatch of the bilayer structure and accurately achieving a targeted geometry.

10 Claims, 22 Drawing Sheets

(51) Int. Cl.
*C04B 35/626* (2006.01)
*C04B 35/64* (2006.01)

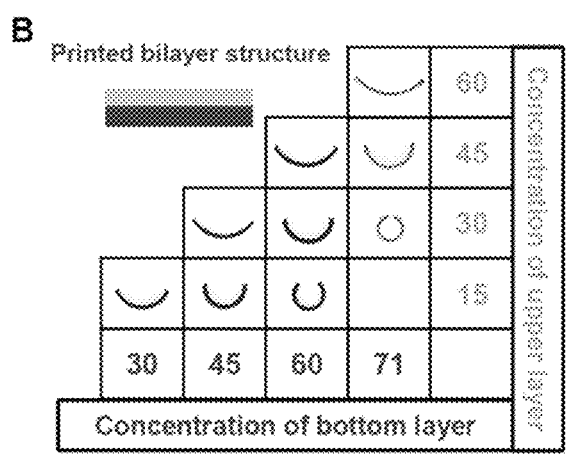
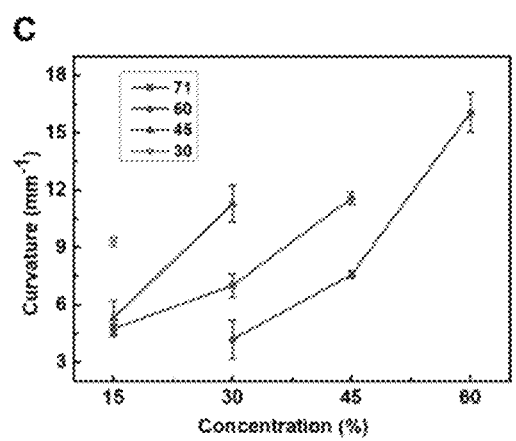
FIG. 3B                                   FIG. 3C

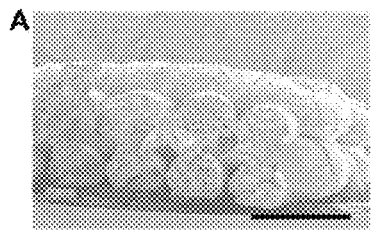 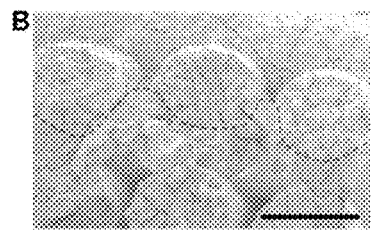 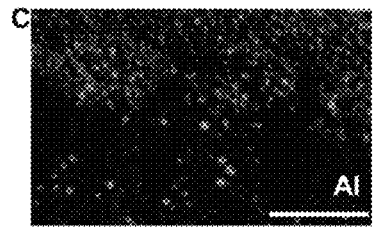
FIG. 10A　　　　　　　　FIG. 10B　　　　　　　　FIG. 10C
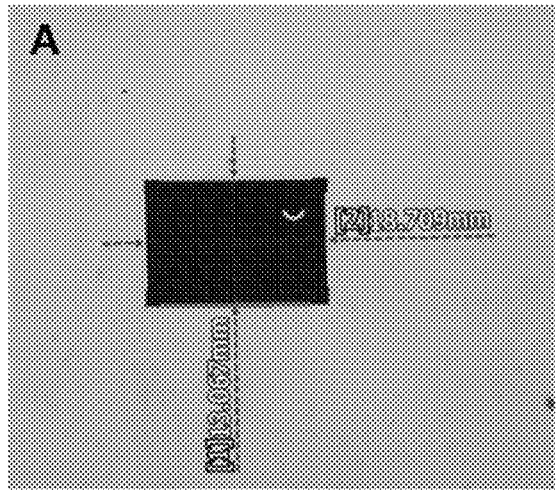 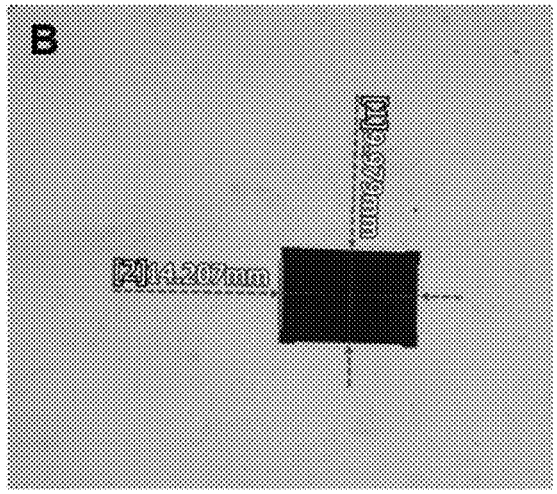
FIG. 11A　　　　　　　　　　　FIG. 11B

DIRECT 4D PRINTING GRADIENT STRUCTURE CERAMICS

FIELD OF THE INVENTION

The present invention relates to the direct printing of gradient structure ceramics, and, more particularly, to a direct 4D printing technology to program targeted shapes of ceramics.

BACKGROUND

Ceramics have been extensively used in engineering applications due to their high melting points, superior hardness, and excellent oxidation resistance. Compared to polymers and metals, complex ceramic devices, such as hinges, chains, and encapsulated ceramics, are difficult to achieve by traditional top-down technologies. The bottom-up technologies, especially 4D printing, open new doors for constructing otherwise unattainable geometries that morph from pre-programmed simple patterns. There are still two main challenges in fabricating shape-morphing ceramics: first, complex shapes are hard to realize without a 3D printer, which restricts the diversity and designability of shape-morphing ceramics. Second, extra fixtures are typically required for the post-programming process after printing, which increases the difficulty and reduces manufacture efficiency. Thus, there is a need in the art for a technique of direct 4D printing ceramics; such a technique could be used to fabricate shape morphing ceramics with intricate structures.

SUMMARY OF THE INVENTION

The present invention provides a direct 4D printing technique to program targeted shapes of ceramics with an internal stimulus; no additional fixtures are required after the 3D printing. The inks for 4D printing were prepared by mixing polydimethylsiloxane (PDMS) with different amounts of alumina nanoparticles. A multi-jet printer was used to print a bilayer gradient structure, each layer including ink with different ceramic mass fractions. During the sintering process, ink with different concentrations underwent different degrees of shrinkage, resulting in a tuneable strain mismatch of the bilayer structure and achieving the targeted geometry accurately by the regulation of ink fractions. To illustrate the ability of this new paradigm, several complex 3D structures with different shapes and topologies such as fingers (multi-curvature), leaves (anisotropic morphing), and a dragonfly (localized deformation) were designed and precisely fabricated. Additionally, the finely transformed ceramics may be created with different colors. As a combination of precisely controlled deformation and color-tunable properties, an assembled bicolor lotus was designed and fabricated. This direct 4D printing ceramics method may be applied to micro-electromechanical systems, aerospace engineering, and artwork design.

In one aspect, the present invention provides a method for forming a gradient structure three-dimensional ceramic article by printing a first layer of a first material having a first fraction of first ceramic particles and a first fraction of a first polymeric ceramic precursor. A second layer is printed such that it is at least partially disposed on the first layer of a second material having a second fraction of second ceramic particles and a second fraction of a second polymeric ceramic precursor, the first fraction of first ceramic particles being different from the second fraction of second ceramic particles. A composite of the first layer and the second layer is heated at a temperature sufficient to decompose the first and second polymeric ceramic precursors and sinter the article wherein a difference between the first fraction of first ceramic particles and the second fraction of second ceramic particles creates an interface stress to cause a selected level of deformation of the ceramic article.

BRIEF DESCRIPTION OF THE DRAWINGS

FIG. 1A shows printing of a bilayer structure with different inks. FIG. 1B shows the curing and sintering of printed bilayer structures. FIG. 1C is the shear rheology properties of four types of ceramic inks. FIG. 1D is a comparison of cured precursor and sample obtained after sintering. FIG. 1E shows detailed filaments of cured and sintered lattice structures. FIG. 1F shows a well-printed nose and ear. FIG. 1G shows the shrinkage ratios of different inks according the ceramic particle loading. FIG. 1H shows the strain-stress curves of cured precursors prepared with different inks.

FIG. 2A shows SEM images of samples made with different alumina proportions. FIG. 2B shows EDS mappings of ceramic samples displaying the distribution of Al and Si with different $Al_2O_3$ concentrations. FIG. 2C shows TEM and SEAD images of samples. FIG. 2D shows optical images of sintered ceramics with different $Al_2O_3$ concentrations.

FIGS. 3A-3D show the control of basic deformation of 4D printed ceramics. FIG. 3A shows the deformation process of printed precursors during sintering (300° C., 600° C., 700° C., 900° C., and 1300° C. from left to right). FIG. 3B shows the control of bending deformation with various inks in a combined structure. FIG. 3C is the relationship between the curvatures and the proportions. FIG. 3D demonstrates the various twist deformations with different printing angles of the upper layer. The scale bars are 1 cm.

FIGS. 4A-4D demonstrate printing ceramics with complex shapes and deformations. FIG. 4A shows cross-shaped structures with different deformations. FIG. 4B shows a palm-shaped structure with different curvature fingers. FIG. 4C shows an anisotropic leaf with 0° and 90° upper layer printing angles to form different bending directions after sintering. FIG. 4D shows a dragonfly in a flat pattern with the insert and base parts, deformed to a 3D flying gesture after sintering. The scale bars are 1 cm.

FIG. 5A is an illustration of a simple twist shape ceramic with bicolor: the inner is black and the outer layer is white. FIG. 5B shows a complex shape ceramic dragonfly with assembled color: the base parts are white and the insert part is black. FIG. 5C shows an assembled structure with two colors. The scale bar is 5 mm.

FIG. 6A shows printed cross-shaped precursors. The top inserts illustrate the two parts of the precursors. FIG. 6B show deformed intricate ceramics. The scale bar is 5 mm.

FIGS. 10A-10C are SEM images (10A, 10B) and EDX mapping (10C) of the cross-section of sintered bilayer structure with different alumina concentration of each layer. The scale bars are 1 mm, 500 μm, and 500 μm, respectively.

FIGS. 11A-11B show the volume change of printed lattice structure after sintering. FIG. 11A is a printed sample. FIG. 11B is a sintered sample. The length and width of precursor and sintered samples were plotted on the images and used to calculate the shrinkage ratio.

DETAILED DESCRIPTION

To obtain self-shaping ceramics without a post-programming process, a gradient bilayer structure was designed, as shown in FIG. 1. The gradient structures are obtained by printing layers having different loading amounts of ceramic particles. During the sintering process, layers having different loading amounts of ceramic particles undergo different degrees of shrinkage, resulting in a tuneable strain mismatch of the layers and achieving a targeted geometry accurately by the regulation ceramic particle loading of each layer. Using this technique, a variety of complex three-dimensional shapes can be formed.

In general, each layer is formed as a 3D printable ink containing ceramic particles and a polymeric ceramic precursor. A variety of ceramic particles may be used including, but not limited to, alumina ($Al_2O_3$), zirconia ($ZrO_2$), titania ($TiO_2$), silicon nitride ($Si_3N_4$), hydroxyapatite ($Ca_{10}(PO_4)_6(OH)_2$), silicon carbide (SiC), yttria ($Y_2O_3$), or aluminum nitride (AlN). In one aspect, the particles may have a particle size ranging from approximately 10 nm to 400 μm. The polymeric ceramic precursor may be selected from a polysiloxane, including polyborosiloxanes and polycarbosiloxanes. Polymers that include Si—N bonds may be used such as polysilazane and poly(organosilylcarbodiimide). Other polymeric ceramic precursors include silica hydrogels and other silicon-containing polymers. An exemplary polymeric ceramic precursor used in the examples below is polydimethylsiloxane (PDMS). In general, the combination of polymeric ceramic precursor and ceramic particles may be selected based on a desired level of shrinkage during sintering, depending upon the desired final product shape. Further, different deposited layers may be selected to have the same or different compositions, allowing the designer to create different properties, layer by layer. In general, printing inks with higher loading fractions of ceramic particles have a lower shrinkage percentage while printing inks with lower loading fractions of ceramic particles have a higher shrinkage percentage.

Figure 1A:
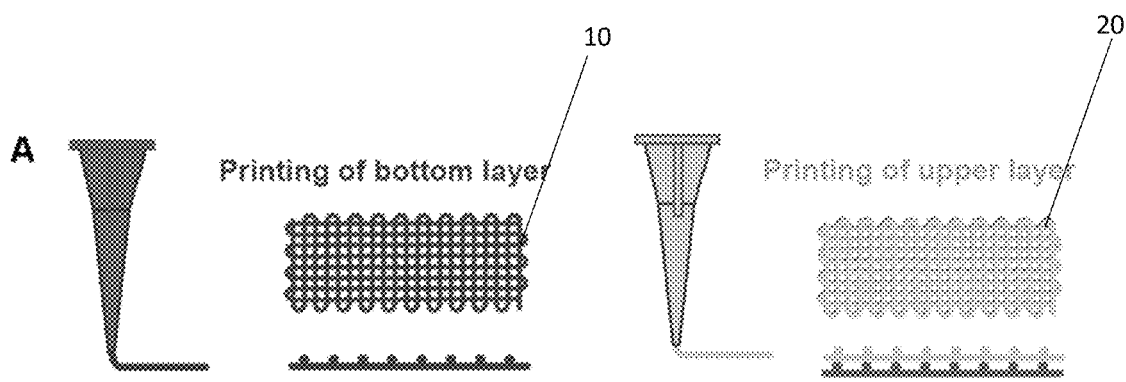
FIGS. 1A-1H depict the direct 4D printing of bilayer structures and basic properties of printed structures.

In one embodiment, a printing ink was fabricated from alumina powder with a PDMS polymeric ceramic precursor; printing inks were classified into five types according to the gradient fractions of alumina powder: 15 wt %, 30 wt %, 45 wt %, 60 wt %, and 71 wt %; however, other fractions may be selected depending upon the desired shrinkage properties of each layer. The printing inks are extruded from two different syringe nozzles with the programmed paths. FIG. 1A illustrates the different printing patterns of the bilayer structures. A first, bottom layer 10 is deposited followed by a second, upper layer 20. In the embodiment of FIG. 1A, the bottom layer 10 may be selected to have a first loading fraction of alumina powder and the upper layer 20 may be selected to have a second loading fraction of alumina powder. Although a two-layer (bilayer) structure is depicted, additional layers may also be provided depending upon the desired shape to be formed. In one embodiment, each layer may have a thickness of approximately 1 mm to approximately 1 cm.

Due to the selected alumina concentrations of each layer, the shrinkage difference during the sintering process yields interface stress, which activates a selected level of deformation. For example, a lower layer having a higher loading fraction of ceramic particles has a lower amount of shrinkage; when coupled with an upper layer having a lower loading fraction of ceramic particles having a higher amount of shrinkage, the resulting structure will exhibit an upward curvature as the interface forces from the larger upper shrinkage will "pull" the lower layer towards it.

Figure 1B:
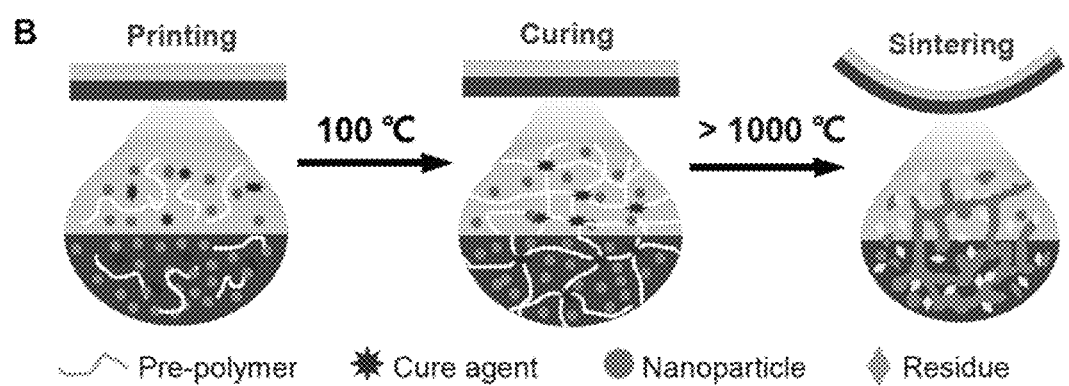

Three main processes are used to fabricate the 4D printed ceramics: (i) printing of a layered structure with different inks (ii) curing at a selected temperature to form a stretchable green body, (iii) sintering at a higher temperature to obtain a selectively-deformed ceramic (FIG. 1B). The curing temperature may be selected to be within a range of approximately 60° C. to approximately 250° C. while the sintering temperature may be selected to be with a range of approximately 800° C. to 2200° C. Depending upon the selected ceramic particles used in the ink and the selected polymeric ceramic precursor as the temperature may be selected to be high enough to decompose the polymeric ceramic precursor, leaving the ceramic.

Figures 1C, 1D, 1E:
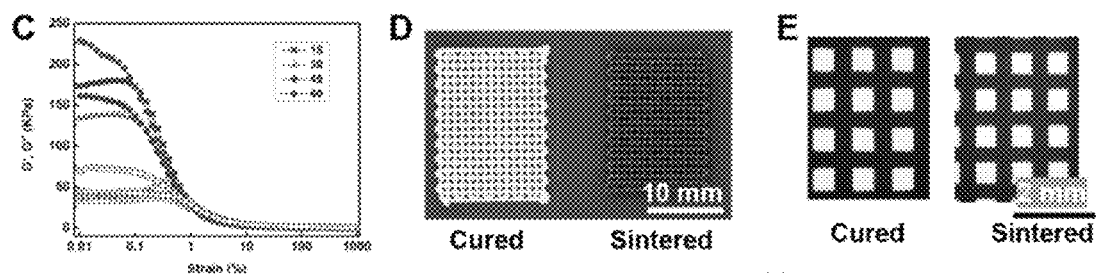
Figure 8:
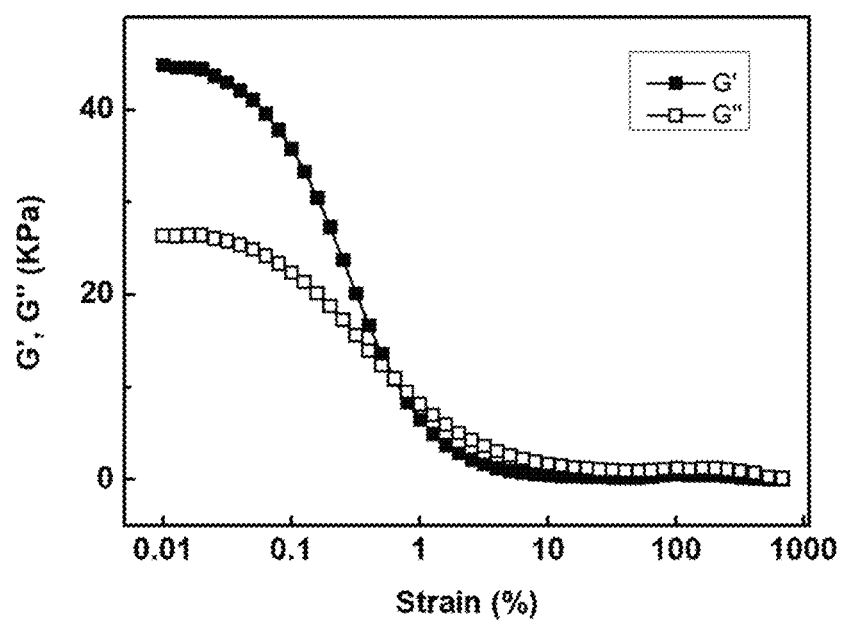
FIG. 8 shows G' and G" of ink with 71 wt % alumina.
Figure 9A:
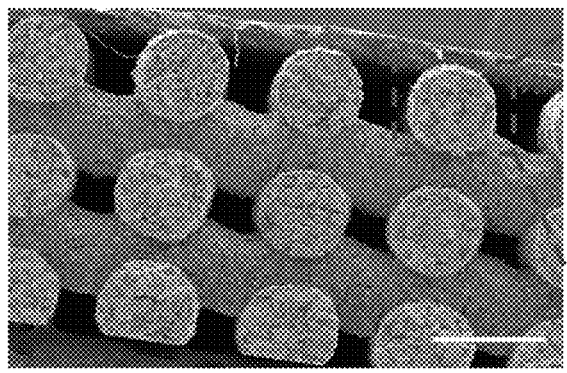
FIGS. 9A-9B show the cross-section SEM images of the sintered lattice structure. The SEM images indicated the clear arrangement of filaments. The scale bars are 500 μm and 100 μm, respectively.
Figure 9B:
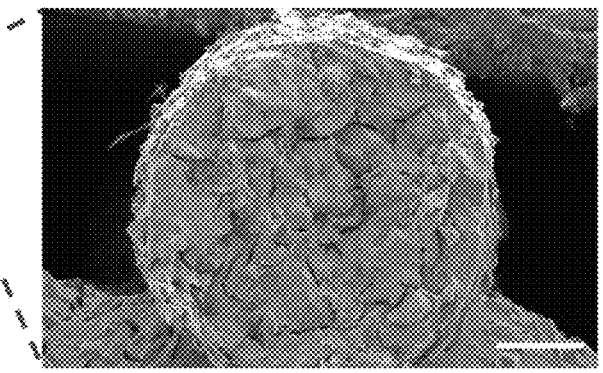

The shear rheology properties of the five exemplary inks set forth above were measured, as shown in FIG. 1C and FIG. 8, which demonstrated excellent printability. FIG. 1D and FIG. 1E show the classified uniform filament classification of the printed and sintered lattice structures, respectively. The distribution stayed intact even after sintering (FIG. 9). As shown in FIG. 10, there is no obvious gap between the top and bottom layers, and the layer with a lower alumina concentration was tightly connected with the layer having a higher alumina concentration.

Figure 1F:
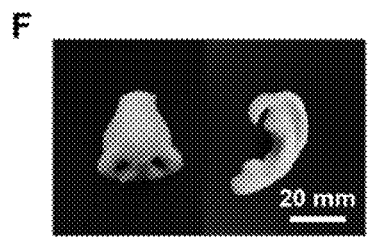
Figure 1G:
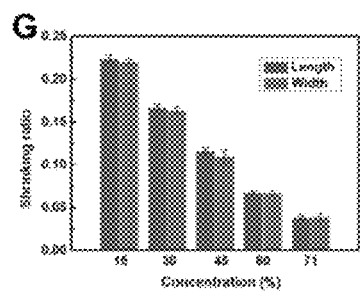
Figure 1H:
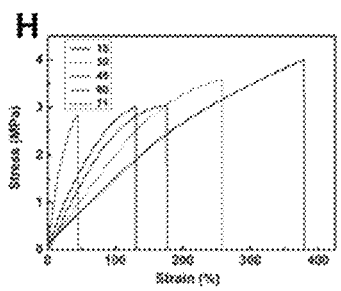
Figure 12:
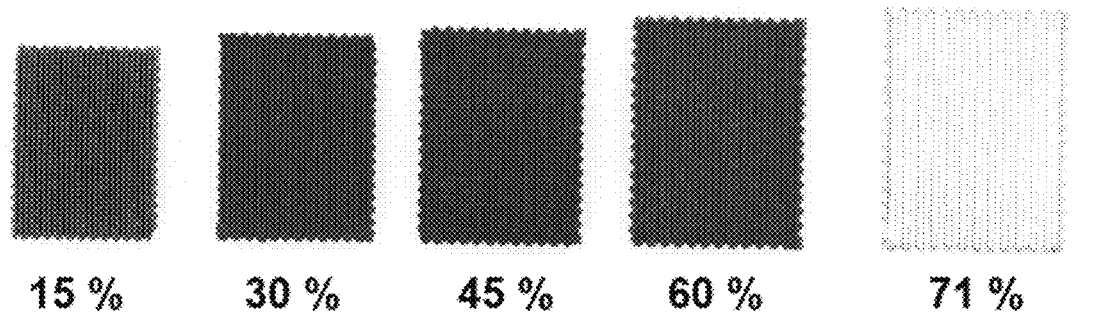
FIG. 12 shows optical images of ceramics with different powder proportions. The shrinkages of sintered ceramics were determined by the proportions of alumina. The higher proportion of alumina leads to smaller shrinkage. The scale bar is 2 cm.
Figure 13:
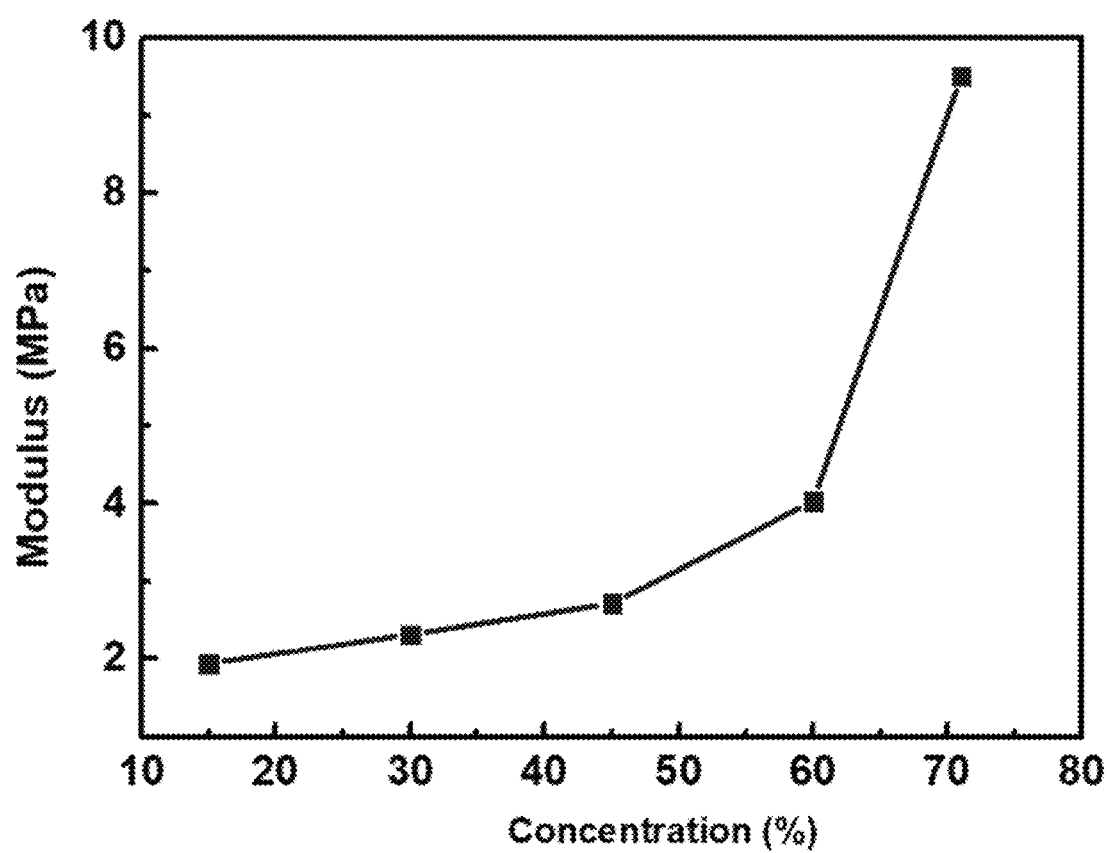
FIG. 13 shows the variation of Young's modulus of the precursor with different alumina powder concentrations. With the increase of alumina concentration, the modulus of precursors grows significantly. The precursors for tensile tests were prepared with 6 mm in width and 0.6 mm in thickness, the gauge length is 20 mm.

Two complex nose and ear models were successfully printed, illustrating the excellent moldability of the inks of the present invention (FIG. 1F). The deformations and the shrinking ratios of the five types of inks after sintering were measured and calculated (FIG. 1G and FIG. 11). The shrinkage ratios of the ceramics after sintering were different according to ceramic loading fractions; lower shrinkage occurs with increased alumina proportion; that is, the shrinkage declines from 0.23 to 0.03 as the ceramics proportion gradually increased from 15 wt % to 71 wt % (FIG. 12). The different amounts of shrinkage enable precise deformation control. All the samples showed large strains during stretching and their stretchability decreased with the increasing alumina concentration (FIG. 1H and FIG. 13).

Microstructure of 4D Printed Ceramics

Figure 2A:
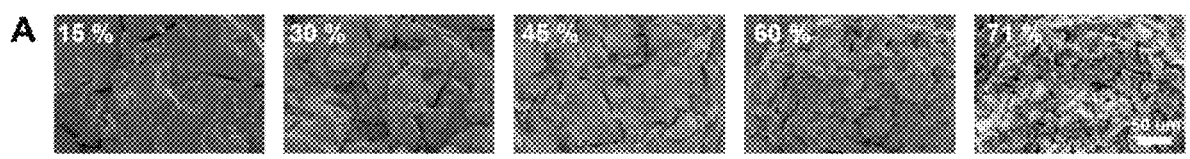
FIGS. 2A-D demonstrate the microstructures of sintered ceramic samples.
Figure 2B:
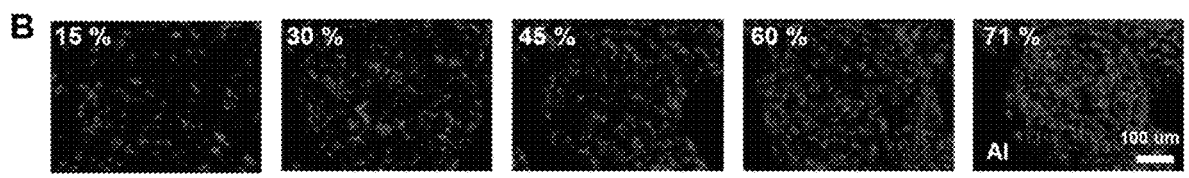
Figures 2C, 2D:
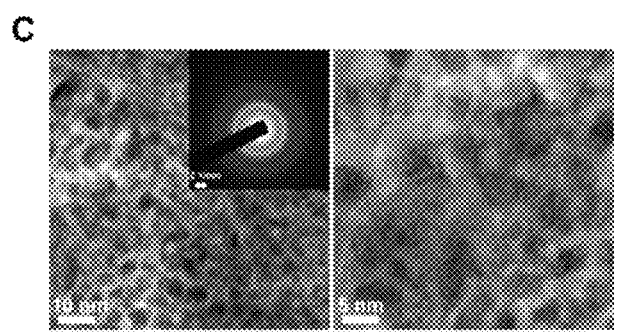
Figure 14:
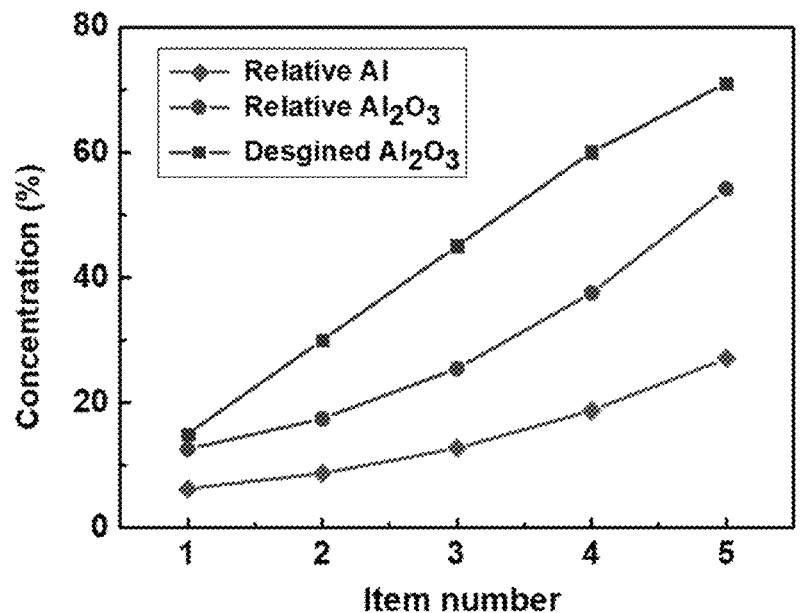
FIG. 14 shows the relative content of Al and designed $Al_2O_3$ concentration. The $Al_2O_3$ concentration from item number 1 to 5 are 15%, 30%, 45%, 60%, 71% respectively. With the increase of the alumina concentration, the content of Al raised significantly.

The microstructure of the sintered ceramic samples is shown in FIGS. 2A-2D. Long cracks were observed in the sample with 15 wt % of alumina, which results from the large shrinkage during sintering; in contrast, the samples with higher alumina proportions became increasingly dense. Only small pores were observed when the alumina concentration reached 71 wt %. FIG. 2B shows the uniform distribution of the Al and Si. With the increasing of the alumina concentration, the content of Al was raised significantly (FIG. 14). The sintered ceramics possessed an amorphous-crystalline dual-phase structure, as ascertained with the transmission electron microscopy (TEM) and selected area electron diffraction (SAED) patterns shown in FIG. 2C. The nanoscaled crystals with sizes of 2 to 5 nm were uniformly spread over the amorphous matrix. It is worth noting that the ceramics showed different colors with different alumina proportions (FIG. 2D). The ceramics presented dark colors due to the high content of residual Si and C, when the alumina concentration proportion was lower (15 wt %-60 wt %). Significantly, the color turned to white when the alumina proportion in inks reached 71 wt %. These results showed the color-controllability of the fabricated ceramics.

Controlling of Basic Deformation

Figure 3A:
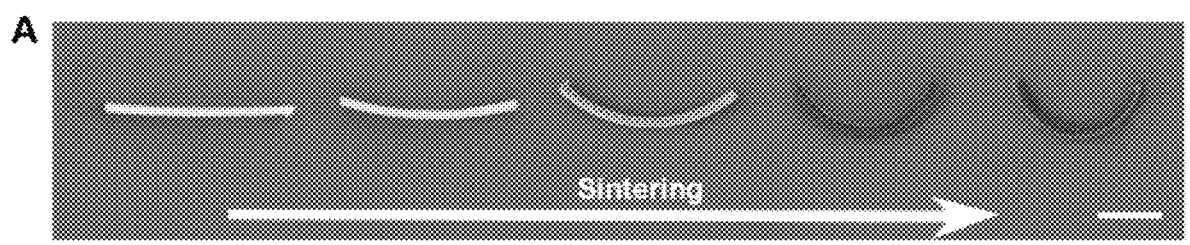
Figure 3D:
Figure 15:
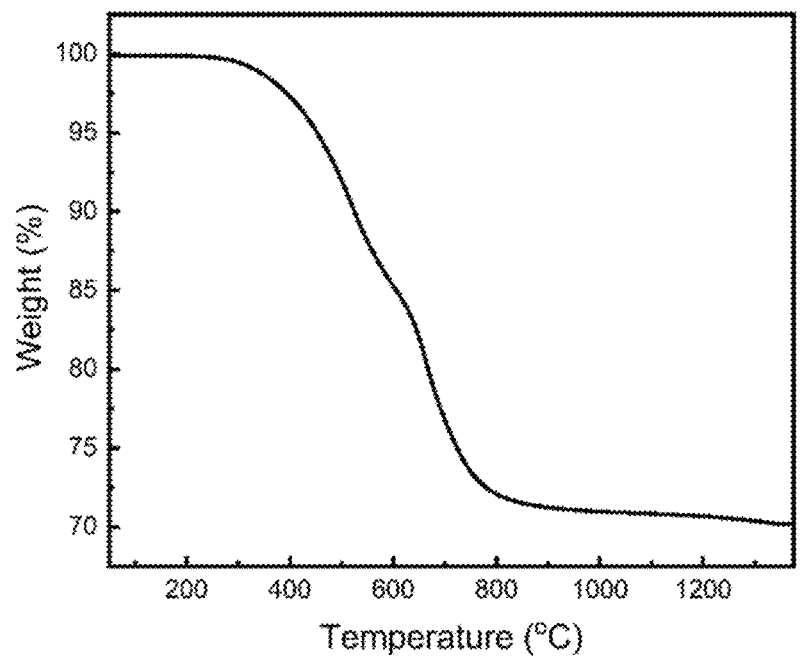
FIG. 15 is the TGA data of the PDMS matrix. The TGA data for the whole range of temperatures (50° C. to 1350° C.) shows the total mass loss of the PDMS matrix was about 29.7%, which is mainly due to the pyrolysis. The mass loss happened in the range of 200° C. to 800° C. The TGA data indicates two stages of pyrolysis happened and the decomposition reaction arose from 450° C. to 850° C. The heating treatment based on this TGA result has been developed. A 2-hour-remain at 850° C. has applied to precursors to achieve complete pyrolysis.
Figure 16:
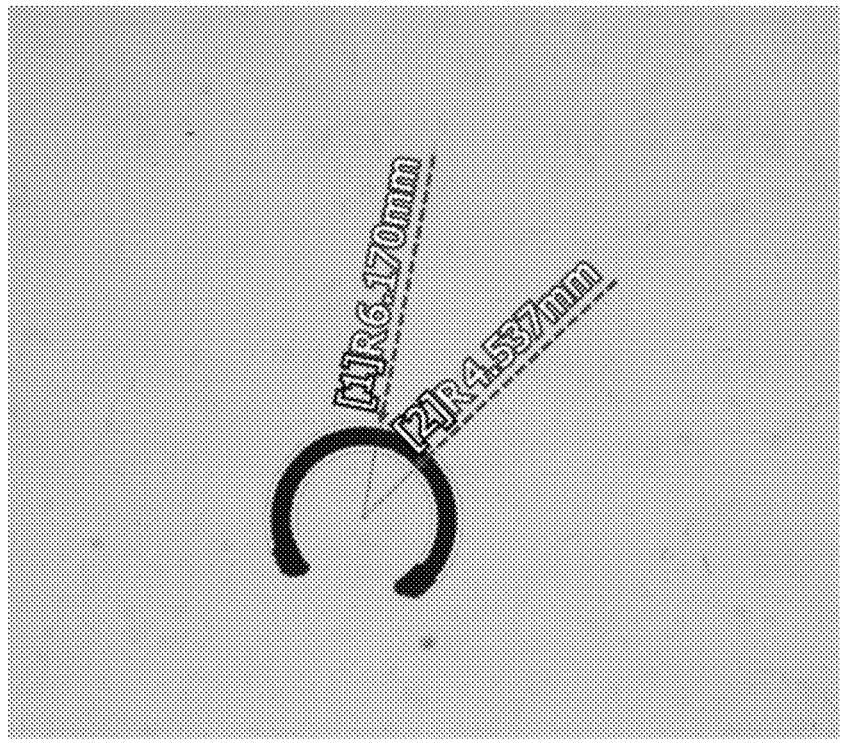
FIG. 16 shows the curvature of deformed ceramics. The inner diameter was used to evaluate the curvature of the sample.

To quantitatively study the deformation, various bending and twisting deformations were fabricated through the tunable ink combinations and programming printing parameters (FIGS. 3A-3D). FIG. 3A shows the entire morphing process of the polymer-derived ceramics during sintering (from room temperature to 1350° C. (FIG. 15). The deformation gradually increased with the rise in temperature. The different curvatures of the sintered bilayer structures with different ink combinations between the upper layer and the bottom layer are shown in FIG. 3B, demonstrating the possibility of programming the controlled deformation and illustrating the realization of controlling curvatures (FIG. 16). The relationship between the curvatures and the designed ink combinations is shown in FIG. 3C. The bilayer structures were printed in rectangular shapes with length, width, and height dimensions of 25×5×1.2 mm. There is a positive correlation between the curvatures and the content differences of the selected inks, demonstrating that any continuously variable structures can be obtained through the tuneable gradient content difference.

Besides the well program-controlled bend morphing, precise twist deformation may also be achieved by altering the printing parameters. When the printing angle of the upper layer changes from 10° to 45° (FIG. 3D), the twist angle increases; while the printing angle continued to change to 75°, the twist angle resumed approximately the same value as the printing angle of 15°. The quantitative description of the basic deformation lays a fundamental paradigm for further precise control of more complex geometries.

4D Printing Ceramics with Complex Shapes and Deformations

Figure 4A:
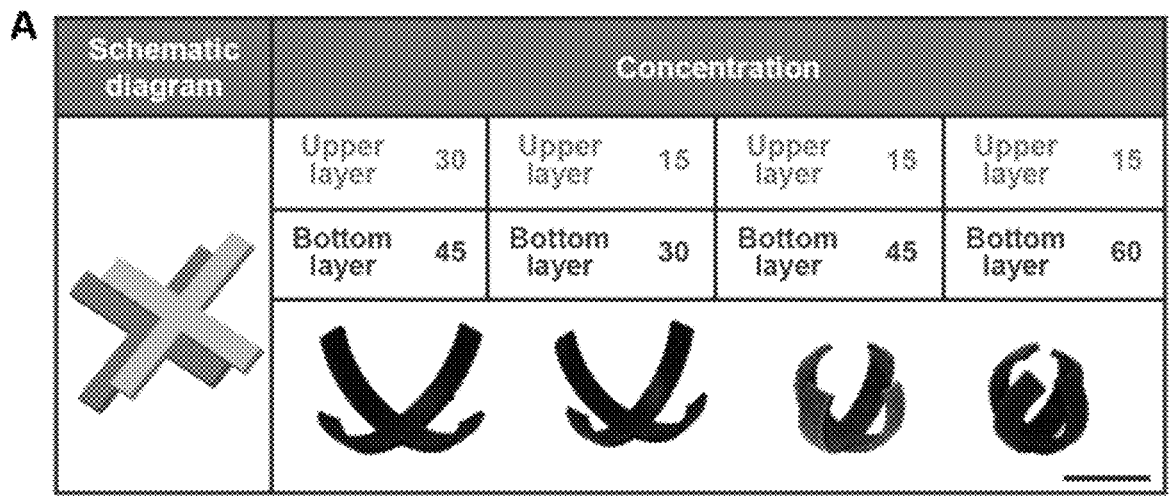
Figure 4B:
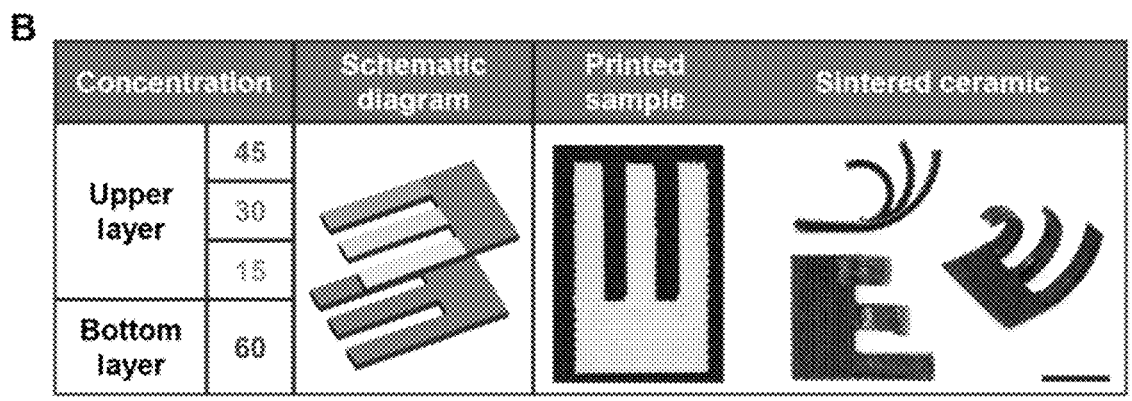
Figure 17:
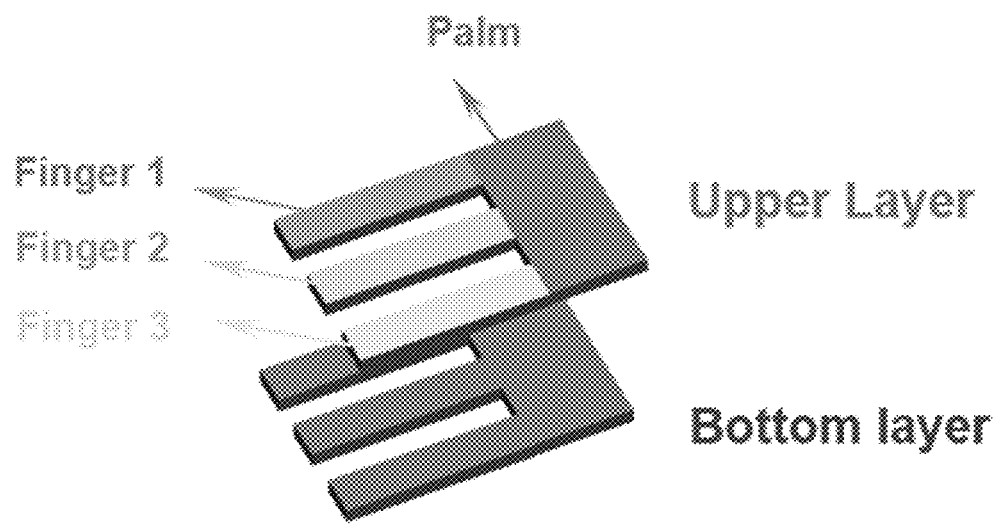
FIG. 17 is a schematic diagram of finger-like structure. The bottom layer was printed with 60 wt % alumina ink. The upper layer consisted of 4 parts: palm (60 wt % alumina), finger 1 (45 wt % alumina), finger 2 (30 wt % alumina), finger 3 (15 wt % alumina). Different curvatures materialized by applying a gradient of alumina proportion within the bilayer structure.

To validate the designability and controllability of this 4D printing method (FIGS. 4A-4D), a series of complex geometries were designed and printed. Based on the above results, targeted geometries were obtained by tuning the mass fractions of alumina. To achieve four targeted grasper-shapes with different curvatures, four cross-shaped structures were printed in the same flat base with gradient alumina mass fractions. After sintering, four different structures were obtained (FIG. 4A). Furthermore, the palm-shaped structure with three disparate fingers was fabricated to illustrate the flexibility of controlling the different curvatures within one object (FIG. 4B). Three fingers were printed by using different inks in the upper layers, while the tuneable bottom layers included an ink with the same ceramic loading, resulting in different curvatures after sintering (FIG. 17). The arrangement of the inks between the two layers provided the possibility of creating a structure consisting of multiple curvatures.

Figures 4C, 4D:
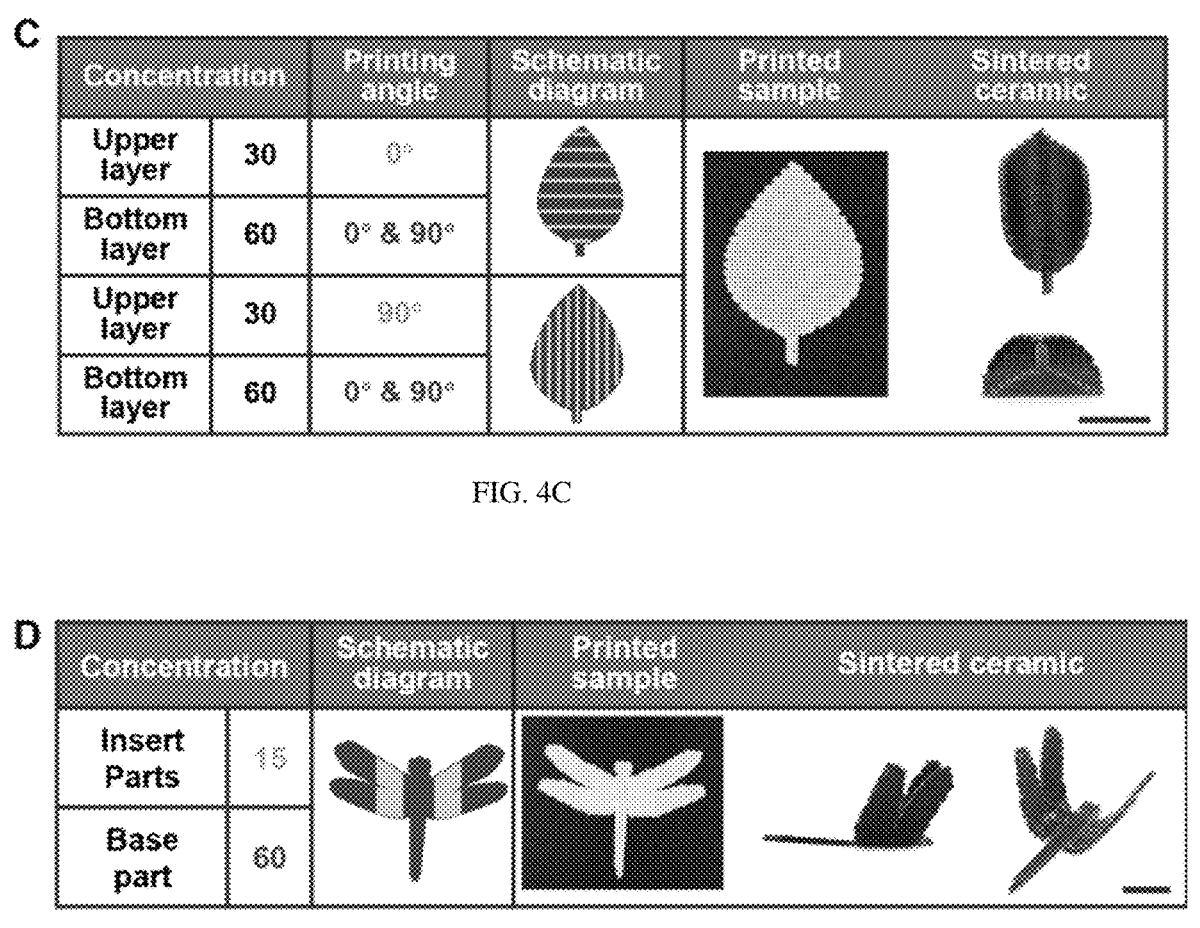
Figure 18:
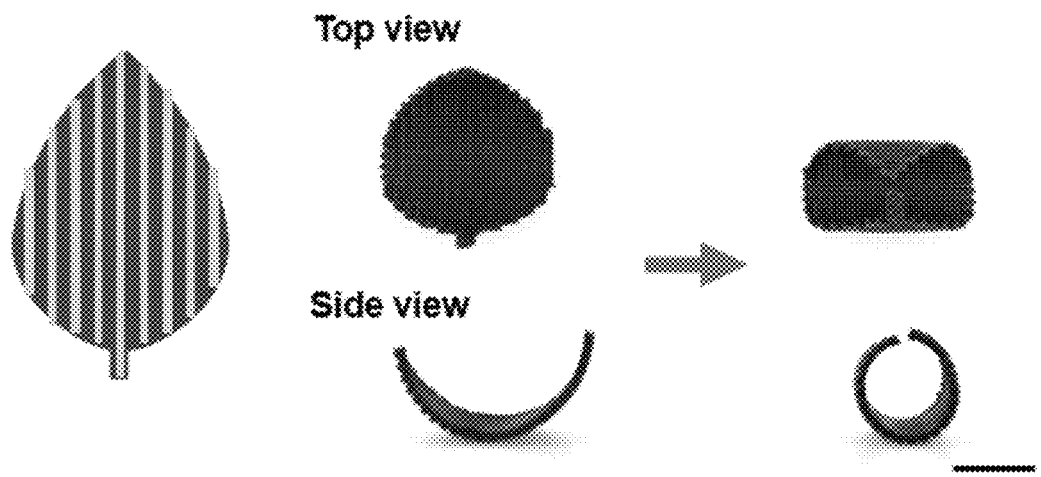
FIG. 18 shows fabricated leaves with increasing curvature. The bottom layer was printed with 60 wt % alumina ink (dark zone), the upper layer (light strips) was printed with 45 wt % alumina ink and 30 wt % alumina ink respectively. The curvatures of the leaves increased along with raising the alumina concentration gradient between the bottom and the upper layers. The scale bar is 1 cm.

In addition to the powder proportion of the ink, the anisotropic deformation may also be achieved by adjusting the printing angles as shown in FIG. 4C. The bottom layer was first printed by using ink with 60 wt % of alumina. The upper layer was then printed using an ink with 30 wt % of alumina at different angles, which were 0° and 90°, respectively. Once the upper layer was printed at 0°, the leaf will bend to the 0° direction, however, the leaf bent to the 90° direction when the upper layer was printed at 90°. The hierarchical geometries could be further designed and adjusted by regulating the arrangement of the inks between the upper layer and the bottom layer (FIG. 18). To further explore the designability of fabricating complex shapes, a plain dragonfly with a localized program was fabricated. FIG. 4D presents the two parts of the printed dragonfly: the base part and the insert part. The base part was printed with 60 wt % alumina ink, and the insert part was printed with 15 wt % alumina ink. After sintering, the insert parts showed bending deformation, while the base part remained flat, resulting in a 3D dragonfly with localized waved wings.

4D Printing Ceramics with Shape-Color Response

Figure 5A:
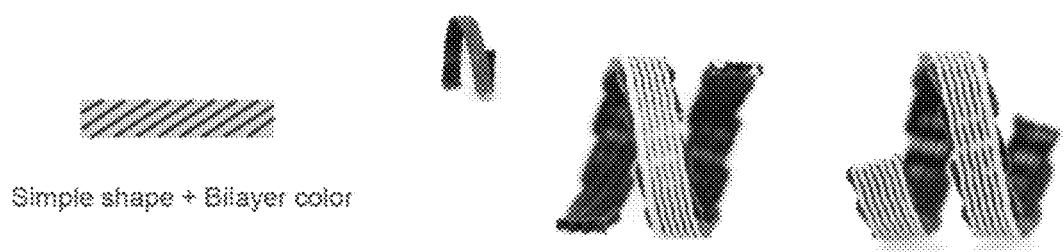
FIGS. 5A-5C show 4D printing of bicolor ceramics.
Figure 5B:
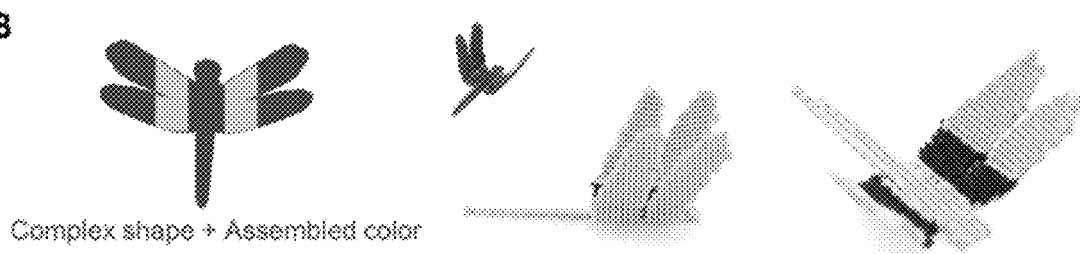
Figure 5C:
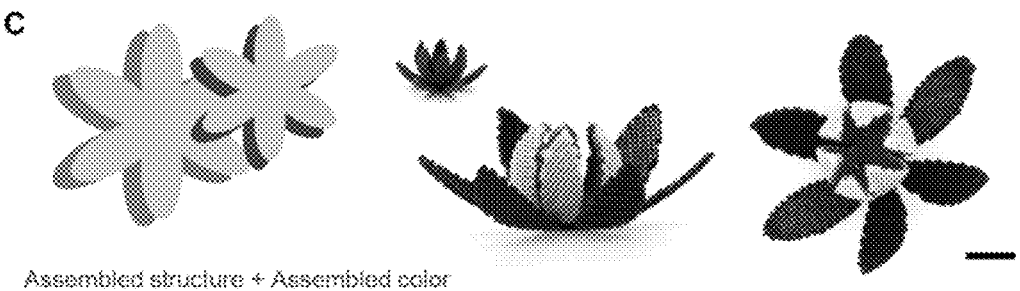

Apart from the precise deformation control, bicolor ceramics were obtained and combined with complicated deformation. Based on the results shown in FIG. 2D, a white ceramic was obtained after the sintering of the 71 wt % alumina inks, while the other inks showed a black color. A simple rectangle was printed with 30 wt % alumina ink for the bottom layer and 71 wt % alumina ink for the upper stripes (FIG. 5A). A twisting structure with white stripes and a black substrate was obtained after sintering. The inset of FIG. 5A shows the twisted sample without color control. This demonstrated the successful combination of color and deformation control. To further prove the design availability with shape morphing and bicolor property, an assembled bicolor dragonfly with complex shape ceramics was manufactured as illustrated in FIG. 5B. The complex shape and bicolor property were achieved at the same time. The black joint part was embedded into the white base part. Furthermore, we fabricated an assembly with assembled structures and assembled color to exhibit the diversity of this direct 4D printing technique. (FIG. 5C).

Fabrication of Intricate Structure

Figure 6A:
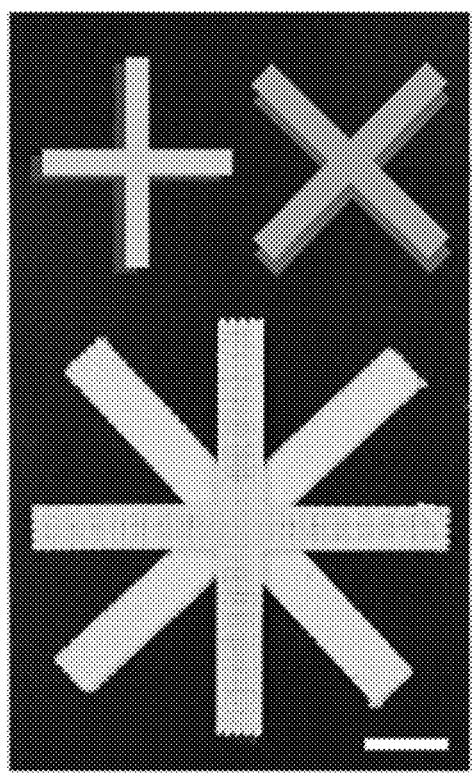
FIGS. 6A-6B show intricate ceramic structures formed according to the invention.
Figure 6B:
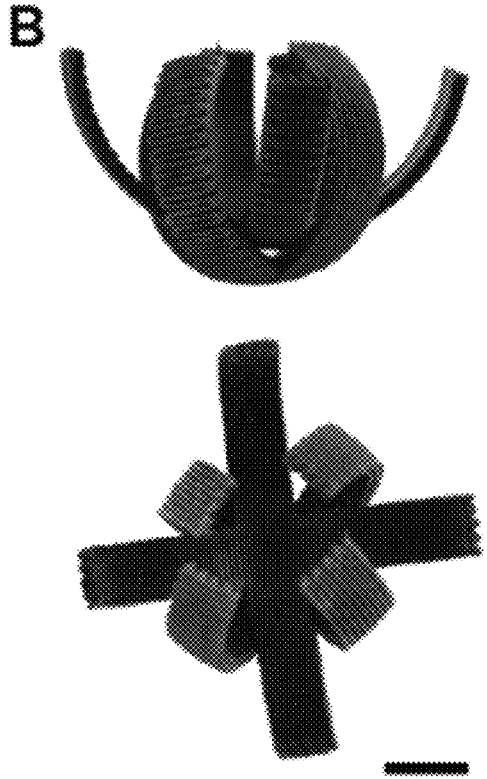
Figure 7:
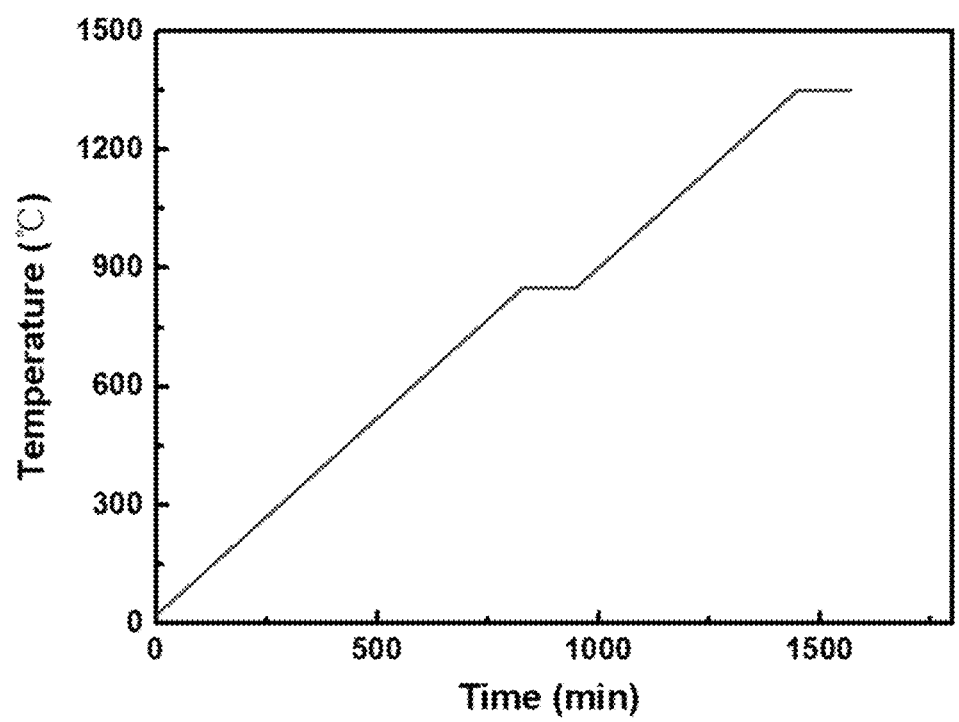
FIG. 7 shows the heating treatment process of the samples. The heating rate is 1° C./min. The sample was kept at 850° C. for 2 h and 1350° C. for 2 h during sintering and cooled to room temperature with the furnace.
Figure 19:
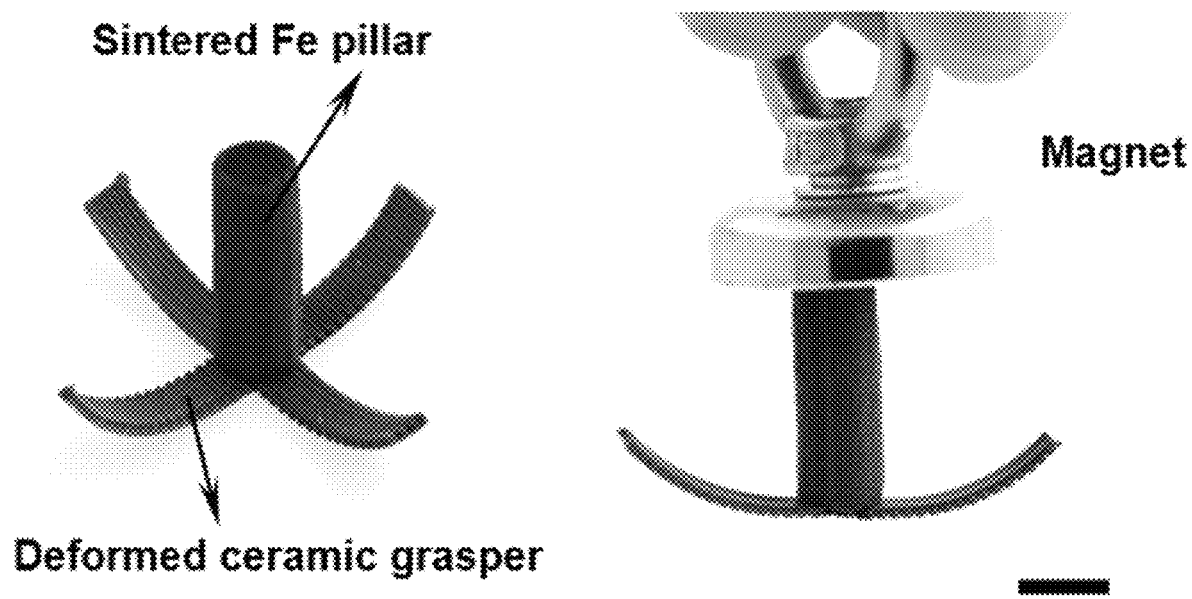
FIG. 19 shows 4D printing of multi-material structures. The 3D structure included a ceramic grasper and Fe pillar. After sintering, the ceramic grasper is bent, while the pillar remains straight. The Fe pillar can be fixed by a magnet. The scale bar is 5 mm.

An intricate geometry was also achieved using the methods of the present invention. Two cross-shaped bilayer structures were first printed with different alumina proportions (FIG. 6). The flat precursors were placed alternately as shown in FIG. 6A. After sintering, the precursors deformed to cages. The inner structure was trapped within the cage, which could no longer be removed without fracturing the cage or the inner structure (FIG. 6B). This example illustrates that the separated precursors can be directly transferred into an inseparable part after sintering without any post-processing procedure or use of fixtures. This design strategy may also be expanded to create multi-material and 3D shape-morphing structures (FIG. 19).

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

The invention claimed is:

1. A method for forming a gradient structure three-dimensional ceramic article comprising:
   printing a first layer of a first material comprising a first fraction of first ceramic particles and a first fraction of a first polymeric ceramic precursor;
   printing a second layer at least partially disposed on the first layer of a second material comprising a second fraction of second ceramic particles and a second fraction of a second polymeric ceramic precursor, the first fraction of first ceramic particles being different from the second fraction of second ceramic particles;
   heating a composite of the first layer and the second layer at a temperature sufficient to decompose the first and second polymeric ceramic precursors and sinter the composite wherein a difference between the first fraction of first ceramic particles and the second fraction of second ceramic particles creates an interface stress to cause a selected level of deformation of the ceramic article.

2. The method of claim 1, wherein the first ceramic particles and the second ceramic particles are each selected from one or more of alumina ($Al_2O_3$), zirconia ($ZrO_2$), titania ($TiO_2$), silicon nitride ($Si_3N_4$), hydroxyapatite ($Ca_{10}(PO_4)_6(OH)_2$), silicon carbide (SiC), yttria ($Y_2O_3$), or aluminum nitride (AlN) particles.

3. The method according to claim 2, wherein the particle size ranges from approximately 10 nm to 400 μm.

4. The method according to claim 1, wherein the first and second polymeric ceramic precursors are each selected from one or more of a polysiloxane, a polyborosiloxane, a polycarbosiloxane, a polysilazane or a poly(organosilylcarbodiimide).

5. The method according to claim 1, wherein the first polymeric ceramic precursor and/or the second polymeric ceramic precursor is polydimethylsiloxane.

6. The method of claim 1, wherein the first fraction of ceramic particles and the second fraction of ceramic particles is in the range from approximately 5% to 71%.

7. The method of claim 1, wherein the thickness of the first layer and/or the second layer ranges from 1 mm to 1 cm.

8. The method of claim 1, wherein the heating is performed at a temperature in a range from approximately 800° C. to 2200° C.

9. The method of claim 1 wherein the selected level of deformation is a curved deformation.

10. The method of claim 1, further comprising a curing process before the heating, the curing process occurring at a temperature of 60° C. to approximately 250° C.

* * * * *